United States Patent Office.

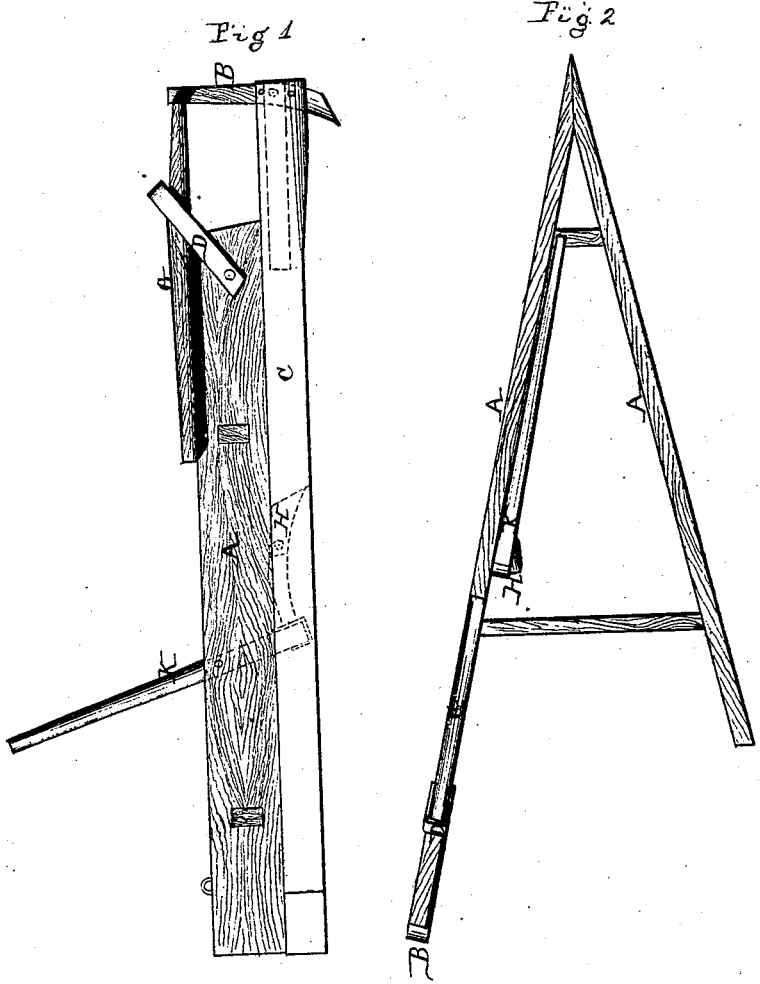

J. G. SISSON AND LARK DELANA, OF ARCOLA, ILLINOIS.

Letters Patent No. 100,199, dated February 22, 1870.

IMPROVEMENT IN DITCHER AND GRADER.

The Schedule referred to in these Letters Patent and making part of the same

*To all whom it may concern:*

Be it known that we, J. G. SISSON and LARK DELANA, of Arcola, in the county of Douglas, and in the State of Illinois, have invented certain new and useful Improvements in Ditcher and Grader; and do hereby declare that the following is a full, clear, and exact description thereof, reference being had to the accompanying drawings and to the letters of reference marked thereon, making a part of this specification.

The nature of our invention consists in the construction of a ditcher and grader, which is provided on the mold-board side with two or more plows, which can be adjusted to any desired depth, by means of levers, pivoted to the side of the frame.

Figure 1 represents a side elevation of our invention.

Figure 2 is a plan view of the same.

Letter A represents the frame of the ditcher, which is plated on the land-side with either iron or steel-plate, made to extend downward below the bottom of the frame, so as to cut deeper and more readily, and bending outward, so as to form suction, thus cutting deeper the heavier the pressure is from the mold-side.

Pivoted to side of the frame there are two or more plows, one being placed near the center and the other at the rear end. The one, B, placed at the end is pivoted between the plating C and a bar extending backward from the frame, and is so constructed that by having a number of holes placed one above the other in the plating the plow can be raised and lowered to any desired depth.

To the rear end of the frame there is attached a keeper, D, to which the lever G is pivoted, by means of which the plow is secured in a perpendicular position, having its upper end bearing against the rear end of the lever.

The plow H, shown in dotted lines, is pivoted to the side of the frame, and is held in position by the lever K in a similar manner.

Should these plows catch against a stone or root, by raising the levers to a vertical position, and again starting the team, the plows will change from an upright to a horizontal position, releasing their points from the obstruction. These plows form sufficient suction to overcome the weight on the mold-board side, and to hold the land-side to the ground.

Having thus described our invention,

What we claim, and desire to secure by Letters Patent, is—

The frame A, plows B and H, levers G and K, and keeper D, when combined so as to form a ditcher and grader, substantially as shown.

In testimony that we claim the foregoing, we have hereunto set our hands this 28th day of July, 1869.

J. G. SISSON.
    LARK DELANA.

Witnesses:
  C. L. EVERT,
  D. HITCHCOCK.